June 1, 1965    L. D. STAPP    3,186,703
VEHICLE WINDOW CONTROL DEVICE
Filed Nov. 15, 1962    3 Sheets-Sheet 1
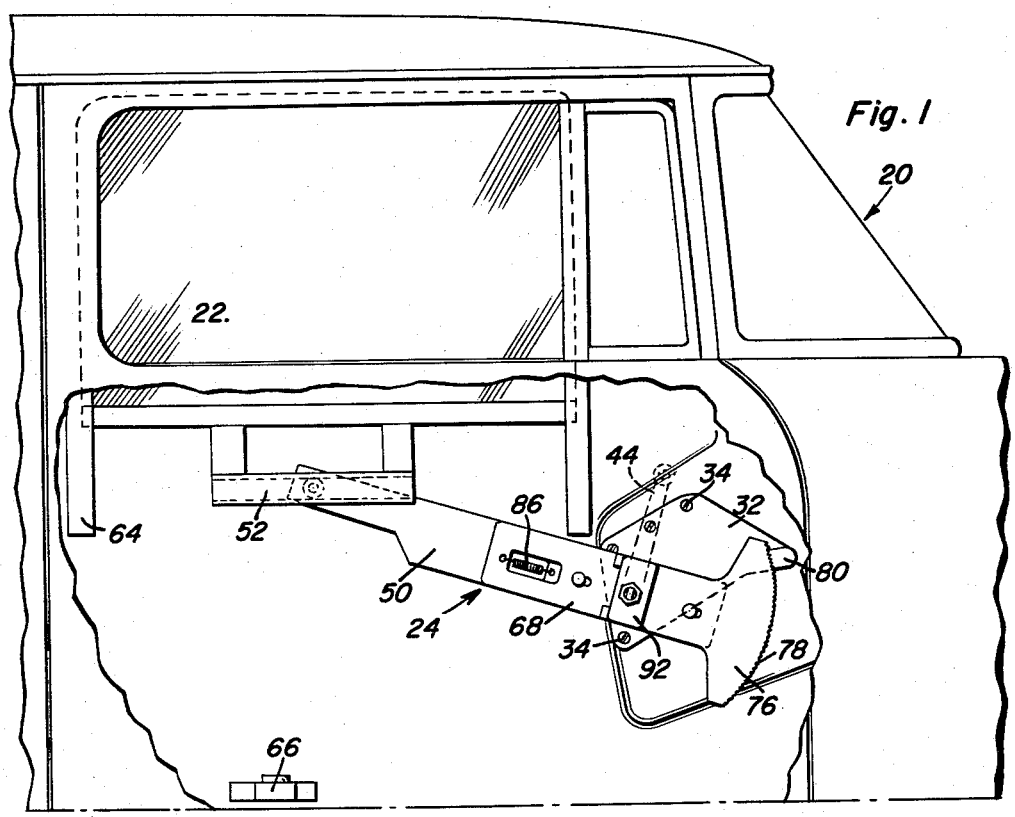
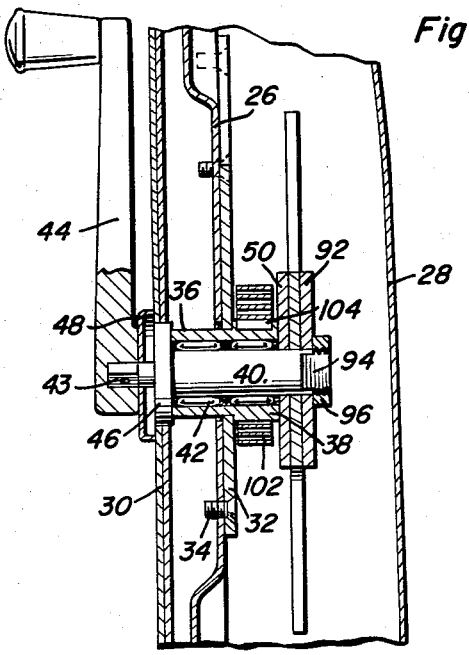
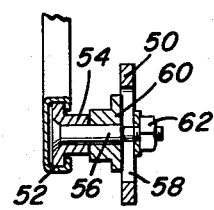
Lloyd D. Stapp
INVENTOR.

June 1, 1965  L. D. STAPP  3,186,703
VEHICLE WINDOW CONTROL DEVICE
Filed Nov. 15, 1962  3 Sheets-Sheet 2
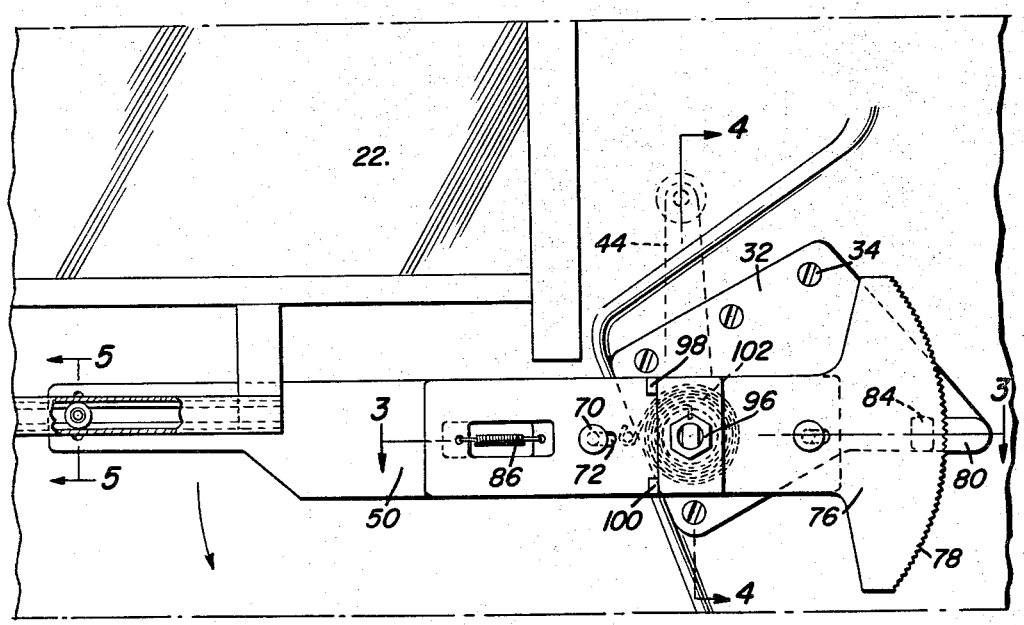
Fig. 2
Fig. 3
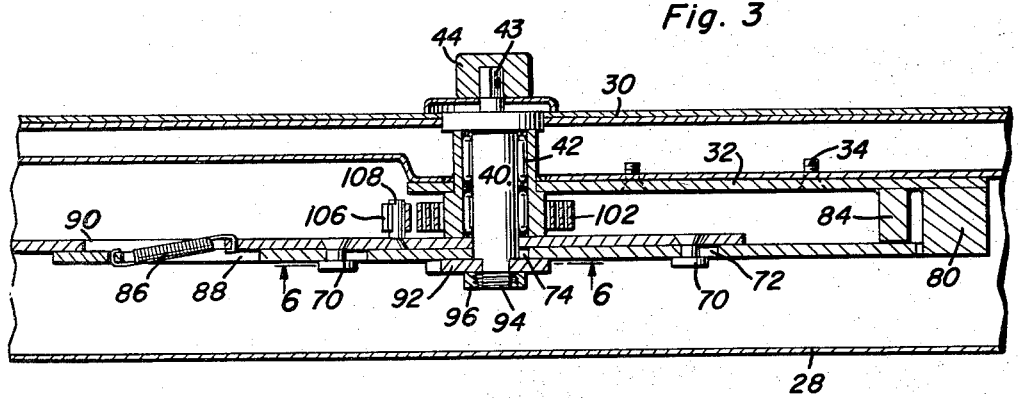
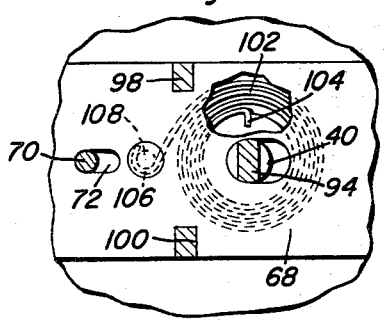
Fig. 6
Fig. 7
Lloyd D. Stapp
INVENTOR.
BY

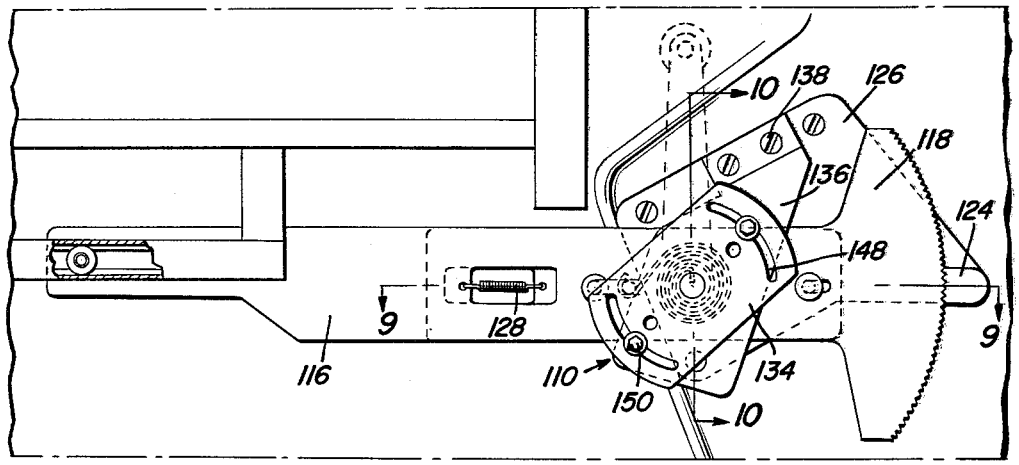
Fig. 8
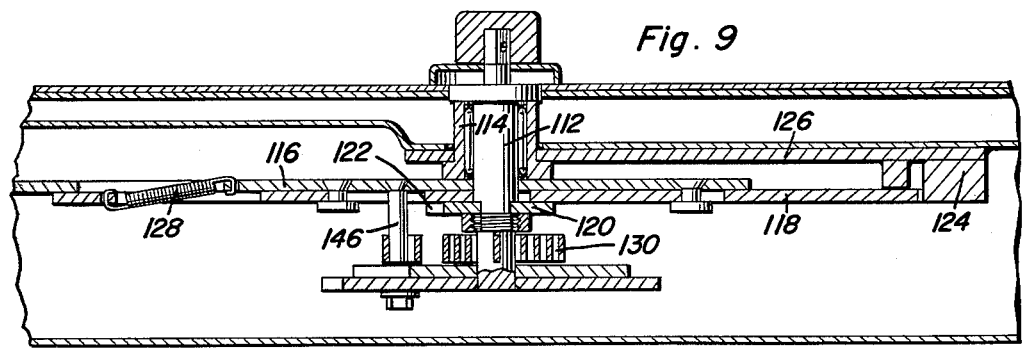
Fig. 9
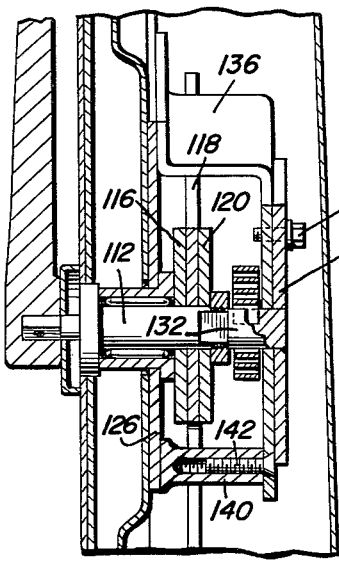
Fig. 10
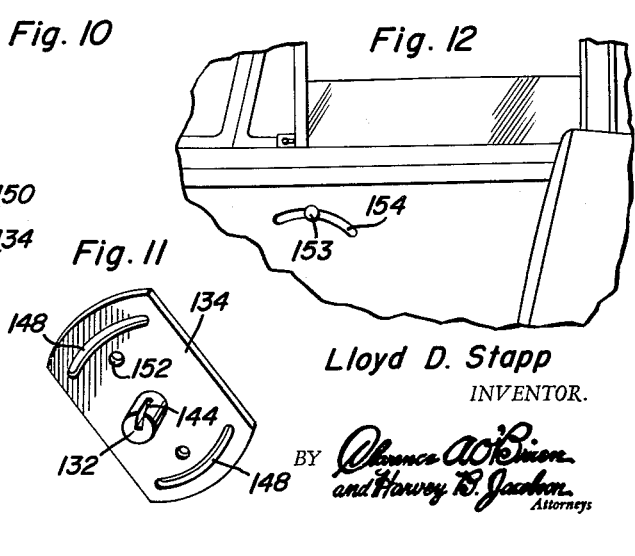
Fig. 11
Fig. 12
Lloyd D. Stapp
INVENTOR.

United States Patent Office 3,186,703
Patented June 1, 1965

3,186,703
VEHICLE WINDOW CONTROL DEVICE
Lloyd D. Stapp, Midland, Tex., assignor of fifty percent to Henry T. Porter, Midland, Tex.
Filed Nov. 15, 1962, Ser. No. 237,835
8 Claims. (Cl. 268—126)

The present invention generally relates to windows, and more specifically to a means for effectively controlling the opening and closing of windows particularly of the type normally found in automobiles or similar vehicles.

It is one of the primary objects of the present invention to provide a simplified window control means capable of efficiently and rapidly adjusting a vehicle window without either the danger of malfunctioning or the time delay frequently encountered in most of the commercially available window control devices.

In conjunction with the above object, it is also an object of the present invention to provide a control device which is capable of locking the window in any predetermined position between a first completely opened position and a second completely closed position.

Likewise, it is an object of the present invention to provide a control device whereby a full range of movement of the window is accomplished by the reciprocation of a handle means through an arc constituting only a minor portion of a circle.

Furthermore, it is contemplated that the reciprocation of the handle means be accomplished with only a minimum amount of effort.

Also, it is an object of the present invention to provide a window control means which can be easily incorporated into all conventional vehicles for the operation of the windows therein.

Additionally, it is an object of the present invention to provide a control device which is simple in construction and capable of being manufactured by conventional methods at a minimum cost.

In accomplishing the above objects, the control device of the present invention is provided with an elongated arm pivotally mounted at an intermediate portion thereof on a transversely extending shaft, a clutch plate also pivotally mounted on the shaft and simultaneously being mounted for solely longitudinal movement on the elongated arm, a stop rigidly affixed to the vehicle body to the rear of the clutch plate and engageable by the clutch plate so as to prevent movement thereof, a control plate affixed to the shaft and rotatable therewith upon a movement of the handle secured to the outer end of the shaft, and upper and lower lugs affixed to the clutch plate with the upper lug being engaged by the upper end of the control plate upon a forward movement of the handle and with the lower lug being engaged by the lower portion of the control plate upon a rearward movement of the handle, these movements causing first a longitudinal movement of the clutch plate so as to disengage it from the stop and a subsequent rapid raising or lowering of the now freely pivoted elongated arm, the window being secured to the forward end thereof for vertical movement responsive to the rotational movement of the arm. Also, in order to help overcome the weight of the window so as to reduce to a minimum the amount of effort needed to raise the window, the present invention contemplates the provision of a biasing spring means tending to equalize the weight of the window, with one modification of the invention providing that this biasing spring means be adjustable thus readily adapting the control device for different weight windows.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial elevational view of a vehicle body with portions broken away so as to illustrate the control device of the present invention mounted therein;

FIGURE 2 is an enlarged elevational view of the control device illustrated in FIGURE 1 in an adjusted position;

FIGURE 3 is an enlarged cross sectional view taken substantially on a plane passing along line 3—3 of FIGURE 2;

FIGURE 4 is a cross sectional view taken substantially on a plane passing along line 4—4 in FIGURE 2;

FIGURE 5 is an enlarged cross sectional view taken substantially on a plane passing along line 5—5 in FIGURE 2;

FIGURE 6 is a view taken substantially on a plane passing along line 6—6 in FIGURE 3 with portions thereof broken away for purposes of clarity;

FIGURE 7 is an enlarged perspective view of the rear end of the mounting plate having the stop means integral therewith;

FIGURE 8 is an elevational view similar to FIGURE 2 illustrating a modified form of the control device;

FIGURE 9 is an enlarged cross sectional view taken substantially on a plane passing along line 9—9 in FIGURE 8;

FIGURE 10 is a cross sectional view taken substantially on the plane passing along line 10—10 in FIGURE 8;

FIGURE 11 is a perspective view illustrating the means by which the biasing spring is adjusted in the modification of FIGURE 8; and FIGURE 12 is a view illustrating the manner in which the control handle can be mounted behind the normally provided facing panel with only the grasping knob showing, this of course requiring an arcuate slot in the facing panel.

Referring now more particularly to the drawings, reference numeral 20 generally designates a vehicle of the type including vertically movable window panels 22. As brought out supra, the present invention is concerned with a novel control device 24 for effecting the desired vertical movement of the glass panel 22. Accordingly, the control device or apparatus 24 is to be mounted on the normally provided concealed frame 26 located between the exterior body panel 28 and the interior decorative panel 30 to one side of the vertical path followed by the window panel 22.

The control device 24 includes a mounting plate 32 shaped so as to conform to the inner frame 26 to which it is fixedly secured by bolts or screws 34. This mounting plate 32 has a tranversely extending sleeve 36 projecting therethrough and rigidly affixed thereto adjacent the forward edge of the mounting plate 32. The inner portion of the sleeve extends to approximately the inside surface of the panel 30 while the outer portion of the sleeve, located on the opposite side of the mounting plate 32 and slightly enlarged as at 38, extends to an intermediate point between the frame 26 and the exterior panel 28.

A transversely extending shaft 40 is rotatably mounted within the sleeve 36 by bearing means 42 and projects beyond both ends thereof. The inner end 43 of the shaft 40 is reduced in diameter and adapted to fixedly receive an operating handle 44 extending parallel to the panel 30 whereby one, by a reciprocal or oscillating movement of the handle can effect a vertical movement of the window panel.

In order to properly orientate the shaft 40 within the sleeve 36 an enlarged collar 46, of greater diameter than the diameter of the sleeve 36, is rigidly affixed to the shaft 40 for abutment against the inner end of the sleeve 36, a combination spacer and trim member 48 being provided between the panel 30 and the handle 44.

An elongated arm 50 is rotatably mounted, adjacent one end thereof, on the end of the shaft 40 extending beyond the outer end of the sleeve 36. This arm is rotatable relative to the shaft 40 and extends rearwardly therefrom into engagement with the window panel 22 for transmitting the oscillating movement of the handle 44 into a vertical movement of the panel 22. This engagement of the arm 50 with the window panel 22 consists of an elongated track 52 secured beneath the panel 22 and receiving therein a follower 54 rotatably mounted on a shaft 56 extending transversely from the rearward end of the arm 50, this shaft being adjustable within an elongated slot 58. The shaft 56 is fixed in an adjusted position by means of a collar 60 rigidly affixed thereto at one side of the arm 50 and a tightening nut and washer 62 threaded on the shaft for engagement with the other side of the arm 50. With such an arrangement, it will be appreciated that a rotation of the arm 50 will result in a movement of the follower 54 along the track 52 along with a vertical movement of the track 52 and the window panel 22 to which it is secured, this movement of the window panel being guided by suitable guide means 64 and limited by suitable stop means 66.

In order to fix the window panel at any adjusted position along its vertical path of travel, a clutch plate 68 is provided, this clutch plate 68 being freely rotatable on the shaft 40 and mounted on the arm 50 for longitudinal movement relative thereto by means of headed studs 70 secured to the arm 50 and extending through elongated slots 72 in the clutch plate 68, a similar elongated slot 74 allowing for a longitudinal movement of the clutch plate without interference from the shaft 40. The rear end of the clutch plate 68 is provided with an enlarged quadrant shaped portion 76 having a serrated or toothed edge 78 selectively engageable with a stop or dog 80 rigidly affixed to the remote portion of the mounting plate 32 and similarly having a plurality of teeth 82 thereon, a guide stub 84 also being provided on the mounting plate 32 for stabilizing the portion 76 of the clutch plate 68 during the movement thereof as will be gone into presently. In order to maintain the clutch plate 68 in engagement with the stop 80 so as to fixedly maintain the window panel 22 in an adjusted position when an actual adjustment of the panel is not being accomplished, a biasing spring 86 is provided within substantially aligned slots 88 and 90 in the forward end of the clutch plate 68 and central portion of the arm 50. This spring means 86 has the rear end thereof secured adjacent the rear end of the arm slot 90 and the forward end thereof secured adjacent the forward end of the clutch plate slot 88 thus biasing the clutch plate 68 relative to the arm 50 and into engagement with the stop 80. As such, it will be appreciated that the clutch plate 68 must first be moved forward against the biasing of the spring 86 so as to disengage the serrated edge 78 prior to a rotational moving of the arm 50 which results, as brought forth supra, in a vertical movement of the window panel 22.

This disengagement of the clutch plate 68 and movement of the arm 50 is effected by a control plate 92 rigidly affixed to the squared off outer end 94 of the shaft 40 for rotation therewith upon a reciprocal rotation of the shaft 40 by movement of the handle means 44. A suitable nut means 96 is threaded on the extreme outer end of the shaft 40 so as to retain the various elements in operative position. This control plate 92 is in juxtaposition to the outer face of the clutch plate 68 and is rotatable relative thereto with both the forward and rearward rotation relative to the clutch plate 68 being limited by upper and lower lugs 98 and 100 rigidly affixed to the clutch plate 68 and projecting outwardly therefrom adjacent the forward edge of the control plate 92 whereby a clockwise movement of the control plate 92 will bring the lower portion of the forward edge thereof into engagement with the lower lug 100 causing a forward movement of the clutch plate resulting in a disengagement from the stop 80 with a continuation of this clockwise movement effecting an upward swinging of the clutch plate 68 and arm 50 resulting in a raising of the window panel 22. Upon a counterclockwise movement of the control plate 90, the upper portion of the forward edge thereof is brought into contact with the upper lugs 98 thus resulting in a forward movement of the clutch plate 68 out of engagement with the stop 80, a continuation of this counterclockwise movement resulting in a downward swinging of the clutch plate 68 and arm 50 resulting in a downward movement of the window panel 22. It will of course be appreciated that immediately upon a release of the handle 44 by which the movement of the control plate is controlled, the serrated edge 78 of the clutch plate 68 will be engaged with the teeth 82 on the stop 80 because of the biasing action of the spring 86.

The elongated nature of the arm 50, as will be recognized, enables the vertical movement of the window panel 22 throughout its entire range by rotational movement of the handle 44 through a relatively small arc thus resulting in a rapid adjustment of the window such as might occasionally be required. Further, in order to equalize the forces needed to both raise and lower the window panels 22, the present invention contemplates the provision of a coil spring 102 biasing the window panel 22 upwardly with a force equalizing the force of gravity acting on the panel 22. This coil spring 102 is wound about the enlarged portion 38 of the shaft 36 with the inner end 104 thereof engaged within a radially extending slot within this enlarged portion 38 and with the outer end 106 engaged about an inwardly extending stub 108 rigidly affixed to the arm 50 thus resulting in an upward biasing of this arm 50 and the window panel 22 therewith. This arrangement results in a device which enables the raising or lowering of a vehicle window by the exertion of a force only slightly greater than that needed to disengage the clutch plate 68 against the biasing of the spring 86 with the fixing of the window panel 22 in any desired adjusted position being immediately effected upon a release of the handle 44, the panel 22 remaining so fixed until a positive grasping and moving of the handle 44 which results in a rotation of the control plate 92 into engagement one of the lugs 98 or 100 thus effecting a disengagement of the clutch plate 68 and a subsequent rotational movement of both the clutch plate 68 and arm 50 so as to vertically adjust the window 22.

The modified window actuating means 110 illustrated in FIGURES 8–11 is similar in both structure and manner of operation to the control device 24 previously described, the only major difference residing in the provision of means whereby the biasing force counteracting the weight of the window panel can be adjusted. This modified form 110 includes a shaft 112 slightly shorter than the shaft 40 but similarly rotatably mounted within a sleeve 114 and rotatably mounting an elongated arm 116 and clutch plate 118, the clutch plate 118, as was the case with the clutch plate 68, being longitudinally movable relative to the arm 116 by means of a control plate 120 engaging upper and lower lugs 122 thus resulting in a disengagement of the clutch plate from the stop 124 provided on the mounting plate 126, this movement being resisted by a biasing spring 128.

The biasing coil spring 130 rather than being mounted directly on the shaft 112 as was the case with the coil spring 102, is mounted outwardly of the outer end of the shaft 112 on the inwardly extending stub shaft 132 of an adjusting plate 134, this adjusting plate 134 being orientated in a plane parallel to the plane of the arm 116 and clutch plate 118 by means of a bracket mount 136 having the upper end thereof extending inwardly and secured to the mounting plate 126 by bolts 138 and having the lower end thereof secured to an internally threaded outwardly extending boss 140 on the mounting plate 126 by bolt means 142. The adjustment of the coil spring 130, the inner end of which is engaged within a slot 144 provided on the stub shaft 132 and the outer end of which is engaged with a stub shaft 146 projecting outwardly from the elongated arm 116 through a slot in the clutch plate 118, is effected by the use of two arcuate slots 148 provided adjacent each end of the plate 134 and bolt means 150 extending through these slots for threaded reception within suitably provided apertures in the bracket 136 through which the stub shaft 132 extends. In adjusting the coil spring 130, the bolts 150 are loosened and the plate 134 turned, as for example, by the use of a spanner wrench inserted within the apertures 152, until the desired compression of the spring 130 is obtained, at which time, the bolts 150 are tightened. Such an arrangement enables the adjustment of the device so as to satisfy the wishes of the individual user as well as adapt the device to use with a wide range of different weight window panels.

While it is preferred that the entire handle effecting the rotation of the mechanisms set forth supra be provided in an exposed manner within the vehicle, FIGURE 12 is intended to illustrate the fact that the present invention also contemplates that this handle can be entirely concealed except for the laterally extending operating knob 153 which will project through an arcuate slot 154 so as to allow for the reciprocal swinging or oscillation of the handle and subsequent raising and lowering of the window panel.

From the foregoing, it is considered to be readily apparent that a novel, efficient, relatively simple, and inexpensive control device for effecting the raising and lowering of windows in vehicles has been defined, this device being readily incorporated into many conventional vehicles. The operation of this device, as will be recognized from the above description taken in conjunction with the drawings, is effected with only a minimum amount of effort with the window being instantaneously locked in adjusted position by releasing the operating handle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A control apparatus for a movable window, said apparatus consisting of a mounting plate, a stop on said mounting plate, a shaft, said shaft extending transversely through said mounting plate and being rotatable relative thereto, an elongated arm, said arm being rotatably mounted on said shaft, a clutch plate, means mounting said clutch plate on said arm for movement in a longitudinal direction relative thereto, means mounting said clutch plate on said shaft for rotation relative thereto, means on said clutch plate releasably engageable with said stop so as to optionally prevent rotational movement of the clutch plate and consequently the arm, means biasing said last mentioned means into engagement with said stop, means secured to said shaft for effecting the rotation thereof, and control means fixed to said shaft and rotatable therewith for causing a withdrawal of the clutch plate from the stop and a subsequent rotation of the clutch plate and arm, said control means consisting of a flat plate in a plane parallel and juxtaposed to one face of the clutch plate, a pair of lugs fixed to said clutch plate, one of said lugs being orientated so as to be engaged by the control plate for effecting a forward movement of the clutch plate out of engagement with the stop and a rotation of the clutch plate and arm in a first direction upon a rotation of the shaft in a first direction, the second of said lugs being orientated so as to be engaged by the control plate for effecting a forward movement of the clutch plate out of engagement with the stop and a rotation of the clutch plate and arm in a second direction upon a rotation of the shaft in a second direction.

2. The apparatus of claim 1 wherein said arm is orientated for movement in a vertical plane, said apparatus including a spring biasing means for urging said arm upwardly and means for adjusting the biasing force of said spring biasing means.

3. The apparatus of claim 2 wherein said spring biasing means and means for adjusting the biasing force thereof comprise an adjusting plate, means mounting said adjusting plate in parallel spaced relation to the arm, a stub shaft fixed to said adjusting plate and projecting inwardly toward said arm, means for fixing said adjusting plate and stub shaft in a plurality of rotatably adjusted positions about an axis through the stub shaft, a second stub shaft fixed to the arm and projecting outwardly toward the plane of the adjusting plate, and a coil spring wound on the adjusting plate stub shaft with the inner end thereof fixed to this stub shaft and the outer end fixed to the arm stub shaft in a manner whereby the tendency of the spring to uncoil will urge the arm upwardly, the varying of the rotational position of the adjusting plate stub shaft varying the biasing force of the coil spring.

4. The apparatus of claim 3 wherein the means mounting the adjusting plate consists of a rigid bracket spanning said arm generally in the vicinity of the shaft mounting the arm, said adjusting plate being engaged against the outer surface of the bracket, said bracket having an aperture therethrough rotatably receiving the adjusting plate stub shaft, said means for fixing the adjusting plate in adjusted position consisting of a pair of elongated arcuate slots through the adjusting plate adjacent the opposite ends thereof, and bolt means extending through said slots and into engagement with the bracket for locking the adjusting plate thereto, said bolt means being slidable in said slots so as to allow a rotation of the adjusting plate upon a loosening of the bolt means.

5. A control apparatus for a vertically movable window, said apparatus consisting of a mounting plate, a rigid stop projecting outwardly from said mounting plate adjacent the rear edge thereof, a shaft extending rotatably through and outward beyond said plate forward of the stop, an elongated arm rotatably mounted on said shaft and projecting forwardly therefrom for support of a window on the forward end thereof, a clutch plate rotatably mounted on said shaft and slidably overlying the outer face of the arm, means mounting said clutch plate on said arm for limited longitudinal sliding movement therealong and rotation therewith, the rear end of the clutch plate being quadrant shaped and located rearward of the arm for locking engagement against rotation with the stop at any point along the quadrant shaped end, means resiliently biasing the clutch plate rearwardly for engaging the rear end thereof with the stop, handle means on said shaft for effecting a rotation thereof, a flat control plate fixed to said shaft for rotation therewith, said control plate slidably overlying the outer face of the clutch plate, said control plate having an elongated forward edge, a pair of lugs fixed to said clutch plate and projecting outwardly therefrom adjacent the forward edge of the control plate for selective sliding engagement therewith, one lug being located above the level of the shaft in a position whereby a continuing rotation of the control plate in a direction so as to bring the upper portion of the forward edge of the control plate into contact with the upper lug and produce a push on the upper lug will result in a forward sliding of the clutch plate so as to disengage the rear end of the clutch plate from the stop and cause a rotation of the clutch plate and arm in the same direction as the control plate through the continuing push exerted on the upper lug by the upper portion of the forward edge of the control plate, the second lug being located below the level of the shaft in a position whereby a continuing rotation of the control plate in a direction so as to bring the lower portion of the forward edge of the control plate into contact with the lower lug and produce a push on the lower lug will result in a forward sliding of the clutch plate so as to disengage the rear end of the clutch plate from the stop and cause a rotation of the clutch plate and arm in the same direction as the control plate through the continuing push exerted on the lower lug by the lower portion of the forward edge of the control plate.

6. The apparatus of claim 5 including an adjustable spring biasing means for urging the arm upwardly comprising an adjusting plate, means mounting said adjusting plate in parallel spaced relation to the arm, a stub shaft fixed to said adjusting plate and projecting inwardly toward said arm, means for fixing said adjusting plate and stub shaft in a plurality of rotatably adjusted positions about an axis through the stub shaft, a second stub shaft fixed to the arm and projecting outwardly toward the plate of the adjusting plate, and a coil spring wound on the adjusting plate stub shaft with the inner end thereof fixed to this stub shaft and the outer end fixed to the arm stub shaft in a manner whereby the tendency of the spring to uncoil will urge the arm upwardly, the varying of the rotational position of the adjusting plate stub shaft varying the biasing force of the coil spring.

7. The apparatus of claim 6 wherein the means mounting the adjusting plate consists of a rigid bracket spanning said arm generally in the vicinity of the shaft mounting the arm, said adjusting plate being engaged against the outer surface of the bracket, said bracket having an aperture therethrough rotatably receiving the adjusting plate stub shaft, said means for fixing the adjusting plate in adjusted position consisting of a pair of elongated arcuate slots through the adjusting plate adjacent the opposite ends thereof, and bolt means extending through said slots and into engagement with the bracket for locking the adjusting plate thereto, said bolt means being slidable in said slots so as to allow a rotation of the adjusting plate upon a loosening of the bolt means.

8. A control apparatus for a vertically movable window, said apparatus consisting of a mounting plate, a rigid stop projecting outwardly from said mounting plate adjacent the rear edge thereof, a shaft extending rotatably through and outwardly beyond said plate forward of the stop, an elongated arm rotatably mounted on said shaft and projecting forwardly therefrom for support of a window on the forward end thereof, a clutch plate rotatably mounted on said shaft and slidably overlying the outer face of the arm, means mounting said clutch plate on said arm for limited longitudinal sliding movement therealong and rotation therewith, the rear end of the clutch plate being quadrant shaped and located rearward of the arm for locking engagement against rotation rotation with the stop at any point along the quadrant shaped end, means resiliently biasing the clutch plate rearwardly for engaging the rear end thereof with the stop, handle means on said shaft for effecting a rotation thereof, a pair of lugs fixed to said clutch plate forward of the shaft and projecting outwardly therefrom, and means fixed to the shaft selectively engageable with one of said lugs, upon rotation of the shaft in a first direction, for forcing said one lug along a forward rotational path, the stop engaged with the end of the clutch plate restricting movement of the one lug, and consequently the clutch plate, to solely a forward longitudinal movement until the clutch plate is disengaged from the stop, said clutch plate upon being disengaged, moving along the rotational path through the force on said one lug and carrying the arm therewith, said last mentioned means being alternatively engageable with the second lug, upon rotation of the shaft in a second direction opposite from the first direction, for forcing said second lug along a forward rotational path opposite from the first mentioned rotational path, the stop engaged with the end of the clutch plate restricting movement of the second lug, and consequently the clutch plate, to solely a forward longitudinal movement until a clutch plate is disengaged from the stop, said clutch plate, upon being disengaged, moving along the rotational path through the force on said second lug and carrying the arm therewith.

References Cited by the Examiner
UNITED STATES PATENTS
2,657,925  11/53  Crow _____ 268—126 X FOREIGN PATENTS
518,758  3/40  Great Britain.
706,952  4/54  Great Britain.

HARRISON R. MOSELEY, Primary Examiner.
CHARLES E. O'CONNELL, Examiner.